United States Patent [19]

Thiele et al.

[11] 4,184,610

[45] Jan. 22, 1980

[54] SEED CUT-OFF ADJUSTMENT FOR A PLANTER DISPENSER

[75] Inventors: Werner H. Thiele, Darien; Vedick A. Erickson, Naperville, both of Ill.

[73] Assignee: International Harvester Company, Chicago, Ill.

[21] Appl. No.: 1,812

[22] Filed: Jan. 8, 1979

[51] Int. Cl.[2] .............................................. B65H 3/08
[52] U.S. Cl. .................................... 221/278; 221/251
[58] Field of Search ................ 221/211, 251, 168–170, 221/236, 237, 278, 217; 111/77

[56] References Cited

U.S. PATENT DOCUMENTS

| | | | |
|---|---|---|---|
| 3,757,996 | 9/1973 | Lienemann | 221/211 |
| 3,790,026 | 2/1974 | Neumeister | 221/211 |
| 3,848,552 | 11/1974 | Bauman | 111/77 |
| 4,148,414 | 4/1979 | Parks, Jr. | 221/278 |

Primary Examiner—Allen N. Knowles
Attorney, Agent, or Firm—James J. Getchius; Neal C. Johnson; F. David AuBuchon

[57] ABSTRACT

An adjustment that includes preferably a pair of spaced, resiliently supported, holders for supporting a cut-off brush against the perforated inner periphery of an air charged, seed containing rotatable drum to remove excess seeds therefrom. The holders rotatably support a pair of brackets having rotatably mounted gauge rollers that engage the inner periphery of the drum. One of the brackets is rotatably adjustable relative to one of the holders to vary the position of the holders and thus the brush in relation to the drum interior for different size seeds.

6 Claims, 4 Drawing Figures

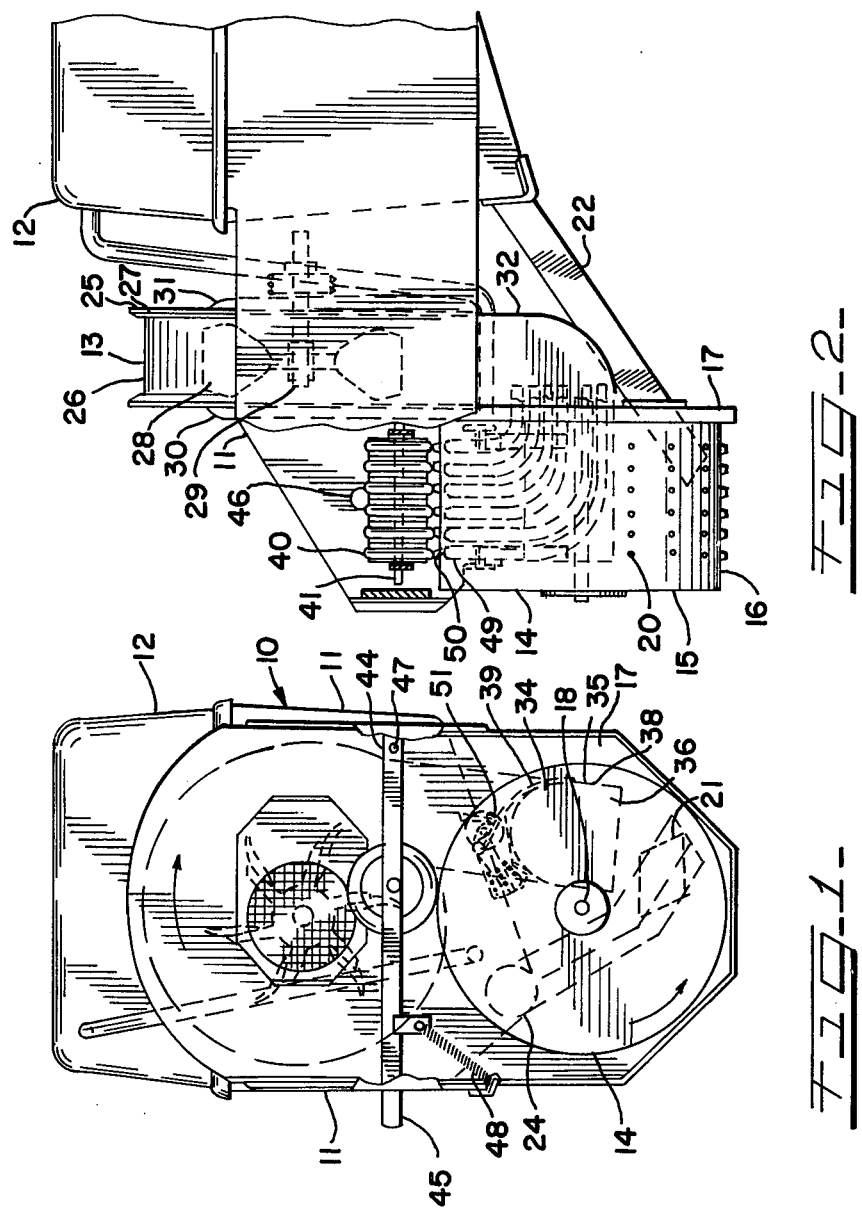

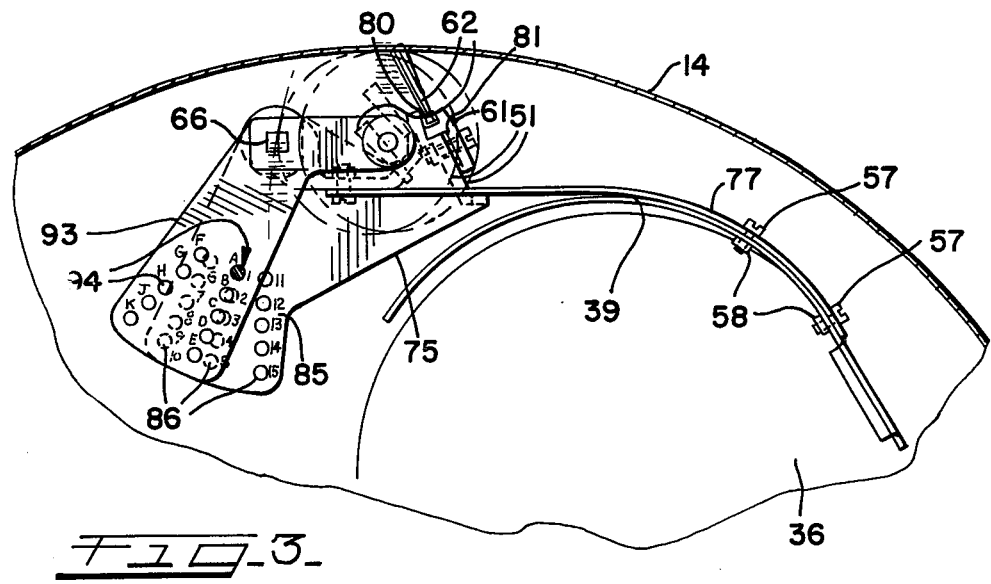
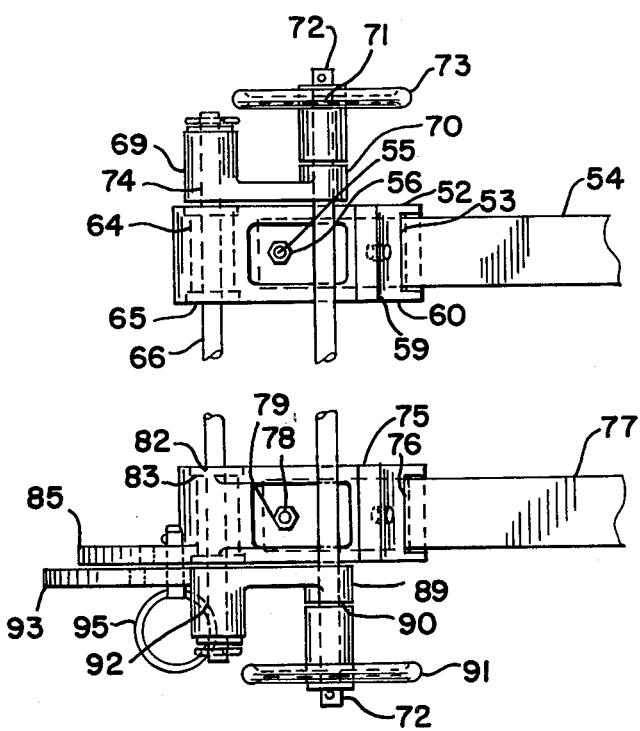

SEED CUT-OFF ADJUSTMENT FOR A PLANTER DISPENSER

BACKGROUND OF THE INVENTION

1. Field of the Invention

This invention pertains generally to seed dispensers for planters and more specifically to air type planters.

2. Description of the Prior Art

A conventional seed cut-off adjustment for planters may be of the type shown in U.S. Pat. No. 3,757,996 issued Sept. 11, 1973 to Darlo E. Lienemann et at. and assigned to subject assignee. The device shown therein is generally useful with an air type planter of the type shown in U.S. Pat. No. 3,848,552 issued Nov. 19, 1974 to J. Bauman et al. and also assigned to subject assignee. The seed cut-off shown in the first named patent has performed satisfactorily except primarily for the lack of sufficient adjustment. Inasmuch as the spaced holders which are resiliently biased toward the inner periphery of the rotating drum along with the rotatably mounted gauge rollers each have merely a shoulder with a slotted hole and the clamping member has a socket for a nylon brush with a bolt and nut fastening means for holding the clamp and brush to the shoulder via the slot, the slot length determines the amount of adjustment available which is limited to about 0.125". Further, the drum must be removed to make the adjustment and the adjustment must be made at each holder of the drum with the distinct likelihood that the brush will not remain in a desired horizontal position.

SUMMARY OF THE INVENTION

Applicants, in view of the lack of adjustment available and also because of the difficulty of making the adjustment, designed the device of subject invention. Specifically, Applicants mounted the holders on separate leaf type springs as in the past and removed the gauge rollers therefrom. One of the holders which could be located adjacent the front position of the revolving drum or adjacent the stationary plate depending upon where adjustment is desired also includes a downwardly extending arm. Preferably three series of five angularly spaced holes are provided. Also both holders have openings therethrough with bushings for a square shaft which supports a pair of spaced gauge roller brackets for related motion. The bushings, however, rotatably support the square shaft. One of the roller brackets has a lever portion that has two spaced series of five holes which bracket is mounted on the square shaft adjacent the holder arm. By rotating the lever and because of the square shaft ends for both brackets, both rollers are forced against the drum inner periphery. Since the rollers are already in this position, the brackets in turn force the holders via the square shaft downwardly and hence the brush held by the holders is moved downwardly from the drum periphery. Contrary lever action moves the brush toward the periphery due to the resilient mounting. The pin, which extends between the holes selected in the lever and arm maintains the relationship of holder to bracket. Some fifteen positions are provided and are correspondingly located to give brush adjustments in equal and predetermined increments of about 1/32", with about 0.5" of total adjustment. Of course adjustment can be accomplished also by utilizing only a single holder and gauge bracket on a short length drum. Also an extreme adjustment of 1.75" is possible where no brush action is desired. Further, the drum need not be removed if suitable means are provided to secure access to the lever and arm and which is reclosable to preserve air during operation. As mentioned the adjustment could also be made through the stationary plate. Also, the brush angle remains generally the same through the full range of adjustment.

It is, therefore, an object of this invention to provide a new and improved seed cut-off adjustment for a planter dispenser.

Another object is to provide a greater range of adjustment by equal and predetermined increments for different size seeds.

BRIEF DESCRIPTION OF THE DRAWINGS

FIG. 1 is a front elevational view of a seed dispenser for an air type planter that embodies the features of this invention;

FIG. 2 is a side elevational view of the structure shown in FIG. 1;

FIG. 3 is an enlarged, front elevational view of the seed cut-off adjustment portion of the dispenser with the rollers only shown in outline; and FIG. 4 is a plan view of the cut-off adjustment.

DESCRIPTION OF THE PREFERRED EMBODIMENT

Referring to FIGS. 1 and 2, the type seed dispenser that utilizes this invention is designated 10. Dispenser 10 is mounted on a pair of supporting plates 11 carried by the planter frame. Dispenser 10 includes a seed hopper 12, a blower 13 and a rotatable selector drum 14.

Drum 14 has a circular outer end wall 15 and a peripheral cylindrical portion 16 which is rotatable against, and in sealing relation to, a stationary frame inner wall 17 which rotatably receives a shaft 18, one end of which is affixed to the wall 15. Shaft 18 projects through stationary wall 17 and is driven by suitable means to revolve drum 14 in the direction shown by the arrow.

Drum 14 has a plurality of axially spaced series of circumferentially spaced holes 20 therethrough. Each series is associated with a furrow created by the planter openers. Each hole is interiorly beveled to receive a seed which however, extends therefrom inwardly. Drum 14 (as in U.S. Pat. No. 3,757,996) may have an inner diameter of 20.05" and may be 11.58" to 14.58" long for 6 to 8 row holes.

Seed located in hopper 12 enters drum 14 via opening 21 located in the lower portion of stationary wall 17 via conduit 22 connected to opening 24 in the bottom of the hopper 12.

Wall 17 forms one wall of blower 13 which is disposed between the drum 14 and the hopper 12. Wall 25 forms a second wall of the blower and is connected by closure 26 to form a housing 27 for fan 28 mounted on the shaft 29 that is rotatably mounted on wall 25. Shaft 29 may be driven by any suitable means for rotation in the direction of the arrow as shown in FIG. 1. Flanges 30 and 31 are utilized to secure the blower to supporting plates 11.

Air under pressure developed by fan action is directed tangentially downwardly and rearwardly through conduit 32 through an opening 34 in wall 17 into drum 14. The air discharges into an upwardly opening air intake member 35 having an end wall 36 a bottom wall and a side wall 38. Side wall 38 has a curved upper portion 39 that serves as a deflector to direct air upwardly in the direction of rotation of the drum.

As drum 14 rotates, seed in the lower part of the drum enters the openings 20 and is retained therein by the differential between the exterior atmospheric pressure and the higher air pressure inside the drum with the air from inside the drum passing around the seed and out each opening 20. To disperse the seed, a discharge area is created by a series of rubber tired rollers 40 mounted on the top of the drum on its exterior with one roller for each series of holes 20. Rollers 40 are mounted on shaft 41 rotatably supported between the sides of fork 44 having handle 45. Handle 45 is slidably received in a slot 46 in one of the supporting plates 11 and pivoted at 47 on the other supporting plate for raising or lowering the rollers from contact with drum 14. Spring 48 holds the handle 45 and thus the rollers to the drum during operation.

As the seeds reach the top of their rotary path, rollers 40 engage the exterior of holes 20 eliminating the pressure differential and the exiting air, thereby allowing the seeds to fall preferably one at a time. Discharge chutes 49 having an open end 50 are located below each drum opening at its upper limit. The air under pressure enters the chutes through the open end and carries the seeds through the chutes which curve at right angles and pass outwardly through stationary wall 17 and are connected to seed tubes (not shown) extending to the furrows opened by the planter.

The suction generated by the air escaping around the seeds attracts additional seeds to the openings 20 and in order to remove the excess seeds and allow only a single seed to be carried to the discharge area to be ejected from the drum 14 through chutes 49 a seed cut-off adjustment means is provided in the drum in advance of the seed discharge area and is designated 51.

Seed cut-off adjustment means 51 is best shown in FIGS. 3 and 4. Cut-off means 51 preferably includes rear holder 52. Holder 52 is an integral element having a slotted opening 53 for the extension of leaf type spring 54 therethrough. Holder 52 is attached to spring 54 by screw 55 and nut 56, and is also attached to support 39 by screws 57 and nuts 58. Spring 54 constantly biases holder 52 toward the inner periphery of drum 14. Holder 52 has surface 59 and surface 60 for contact by clamp 61. A suitable screw and nut, similar to that shown in FIG. 3, maintains clamp 61 to holder 52 with cut-off brush 62 therebetween. Holder 52 also has bore 64 with bushing 65 therein. Square shaft 66 is located in bushing 65 and is rotatably supported by holder 52. Also mounted on shaft 66 is gauge means 69 which is included in cut-off means 51. Gauge means 69 is required since the seeds, even of the same grade, vary in size and extend inwardly of the bevelled opening 20. Thus the cut-off brush must be spaced therefrom so as to not dislodge the individual seed from the opening, but only the adjacent and inwardly extending excess seeds. To accomplish this, gauge means 69 includes rear bracket 70. Bracket 70 has bore 71 for shaft 72 which rotatably supports roller 73. Roller 73 is maintained in position by a cotter pin or the like. Roller 73 is positioned on the shaft for contact with the interior of drum 14 so that same avoids openings 20. Bracket 70 also has a square bore 74 for mounting on square shaft 66 for rotation therewith. Bracket 70 is mounted on the shaft by suitable washers and pins. No adjustment for the rear bracket 70 and rear holder 52 is provided as the adjustment is accomplished preferably adjacent the other end of the shaft 66.

Cut-off means 51 also includes front holder 75. Holder 75 is similar to holder 52 except for its adjusting structure. Specifically holder 75 has slotted opening 76 for the extension therethrough of front leaf spring 77. Holder 75 is attached to spring 77 by screw 78 and nut 79. Spring 77 is similarly attached to support 39 as spring 54. Front holder 75 also has surfaces 80 and 81 for contact by clamp 61. A suitable screw and nut maintains clamp 61 to holder 75 with cut-off brush 62 therebetween. Front holder 75 also has bore 82 for bushing 83 for square shaft 66. Thus, holder 75 also rotatably supports shaft 66. Front holder 75 also has arm 85 extending therefrom. Arm 85 has three series of five spaced holes 86 numbered as shown. Each hole is located on a radius from the center of bushing 82 and is generally angularly spaced thereabout.

Cut-off means 51 also includes front bracket 89 of gauge means 69. Bracket 89 has bore 90 for shaft 72 which rotatably supports front roller 91 as with rear bracket 70. Brush 62 extends between rollers 73 and 91. Bracket 89 similarly has square bore 92 for shaft 66. Bracket 89 also has lever portion 93 with preferably two lettered series of five holes, each labeled 94. Quick release pin 95 having a spring detent on an end and extending between holes 94 of lever 93 and holes 86 in arm 85 maintains gauge means 69 to cut-off means 51.

To achieve the desired equal increment brush adjustment, Applicants started their design with the brush 62 located in the topmost interference position as shown in solid lines in FIG. 3 with the increments shown in broken lines. By treating the spring supports as a radius, and thus disregarding spring deflection, equivalent downward motion of shaft 66 and thus holders 52 and 75 which pivot thereabout was plotted as noted in broken lines. Inasmuch as rear and front brackets 70 and 89 are also mounted on square shaft 66, they also assume comparable positions, but with the attached rollers remaining in contact with the drum 14 inner periphery at all times. Thus, by rotating lever 93 in relation to arm 85, the brackets are also rotated forcing the rollers against the drum inner periphery which in turn (since no movement is possible), via the brackets, forces shaft 66 downward against the spring action. Since the brackets and holders are located on the shaft 66, the holes in the lever and arm are all on the same radius even though the shaft moves downwardly. Holes 1 through 15 on arm 85 are located as shown and holes A through K (I excepted) are located accordingly therefrom upon moving through the 14 steps of shaft 66 while also maintaining the rollers against the drum inner periphery. Rotation of lever 93 in the direction of the arrow will thus cause hole B to align with hole 2, C to 3, D to 4, E to 5, and then the series starting with F to 6, G to 7, H to 8, J to 9, K to 10, and eventually the series A-11, B to 12, C to 13, D to 14, E to 15, with the last detail providing the final intermediate working brush 62 adjustment as shown in broken lines in FIG. 3. Inasmuch as the rotation of lever 93 to arm 85 coincides with the plotted positions of shaft 66 shown schematically in broken lines (due to size) which in turn corresponds to the brush increments shown in broken lines, equal and predetermined increments of brush travel are achieved by the adjustment structure described. It is to be noted that the angularity of brush to drum as shown in broken lines does not change significantly enough to affect efficient brush operation. Also if the lever 93 is rotated to align hole K to hole 15, the brush is moved to the lowest position shown in broken lines where same will not remove excess seed if desired for special applications. The roller position shown in broken lines discloses its maximum travel. Contrary movement of lever 93 will cause the brush to move toward the drum inner periphery aided by the spring action.

It is believed that the operation of the device is apparent from the discussion of the development of the adjustment structure.

What is claimed is:

1. In a seed dispenser for a planter of the type comprising a stationary wall, a seed selector drum rotatably mounted on said wall and having peripheral openings therein, means for rotating said drum, means for supplying seeds to said drum, means for delivering air under pressure to the interior of said drum to attract and hold seeds to said openings by a pressure differential between the interior and the exterior of said drum and to carry the seed to a discharge area after a predetermined rotation of said drum, and seed cut-off means resiliently mounted in said drum from said stationary wall and in the path of the seed carried by said drum and in advance of said discharge area so that when a plurality of seeds are attracted to an opening causing one or more seeds to protrude further from said seed selector drum than would a single seed, the excess are engaged and removed from said seed selector drum, said seed cut-off means including gauge means engageable with the inner periphery of said drum wherein the improvement comprises: said gauge means further comprising a bracket, a roller rotatably mounted on said bracket and engaging said drum inner periphery, said bracket being pivotally supported by said seed cut off means and means for varying and fixing the position of said seed cut off means relative to said gauge means for varying sizes of seeds.

2. The seed dispenser of claim 1 in which said seed cut off means further comprises a holder having an arm and said gauge means further comprises a lever, whereby rotation of the lever in relation to the arm causes the cut off means to move relative to the drum.

3. The seed dispenser of claim 2 in which said seed cut off means further comprises a brush mounted in said holder for dislodging the excess seed and latch means for fixing the position of the lever to the arm.

4. The seed dispenser of claim 3 in which said seed gauge means further comprises a second bracket and a second roller rotatably mounted on said bracket and engaging said drum inner periphery at a spaced interval from said first roller, and a shaft, said shaft being mounted for rotation with said second bracket and said first bracket of said gauge means and said shaft being rotatably supported by said seed cut off means, and said seed cut off means further comprises a second holder, said brush extending between and being supported by both holders.

5. The seed dispenser of claim 4 in which a separate leaf type spring supports each holder and in which a shaft extends between each bracket and rotatably supports each roller.

6. The seed dispenser of claim 5 in which rotation of said lever relative to said arm through a series of latched positions moves the brush relative to the drum in corresponding predetermined and substantially equal increments while maintaining substantially the same angularity between brush and drum.

* * * * *